(12) United States Patent
Suzuki et al.

(10) Patent No.: US 7,151,882 B2
(45) Date of Patent: Dec. 19, 2006

(54) OPTICAL ANTENNA

(75) Inventors: Jiro Suzuki, Tokyo (JP); Yoshihito Hirano, Tokyo (JP); Toshiyuki Ando, Tokyo (JP); Yasuhisa Tamagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/532,811

(22) PCT Filed: Jan. 31, 2003

(86) PCT No.: PCT/JP03/01034

§ 371 (c)(1),
(2), (4) Date: Apr. 26, 2005

(87) PCT Pub. No.: WO2004/068746

PCT Pub. Date: Aug. 12, 2004

(65) Prior Publication Data

US 2006/0008238 A1 Jan. 12, 2006

(51) Int. Cl.
*G02B 6/00* (2006.01)
(52) U.S. Cl. .......................................... 385/147; 385/24
(58) Field of Classification Search ................ 385/147
See application file for complete search history.

(56) References Cited

U.S. PATENT DOCUMENTS

2004/0234193 A1* 11/2004 Mouri .......................... 385/24

FOREIGN PATENT DOCUMENTS

| JP | 59-85150 A | 5/1984 |
|---|---|---|
| JP | 61-98033 A | 5/1986 |
| JP | 63-95742 A | 4/1988 |
| JP | 4-93910 A | 3/1992 |
| JP | 8-65031 A | 3/1996 |
| JP | 9-64821 A | 3/1997 |
| JP | 10-233738 A | 9/1998 |
| JP | 11-177501 A | 7/1999 |
| JP | 2000-98027 A | 4/2000 |
| JP | 2001-285203 A | 10/2001 |

OTHER PUBLICATIONS

Yoshinori Arimoto et al., SPIE vol. 1866, California, Jan. 20-21, 1993, pp. 246-254.
Oliver Reitebuch et al., Institut fuer Physik der Atomoshare Report No. 149, Feb. 2001.

* cited by examiner

*Primary Examiner*—Jennifer Doan
(74) *Attorney, Agent, or Firm*—Birch, Stewart, Kolasch & Birch, LLP (57) ABSTRACT

An optical antenna includes an optical element mount (3) for mounting fiber ends (1a and 2a) of optical fibers (1 and 2) at different positions; and an optical transmitting and receiving system (4) for collimating, when laser beams are radiated from the fiber ends (1a and 2a), the laser beams to parallel light rays toward the space, and for focusing, when laser beams arrive from the space, the laser beams onto the fiber ends (1a and 2a) This makes it possible to set two optical transmitting and receiving directions 5 and 6 without installing complicated mechanical elements.

5 Claims, 10 Drawing Sheets

OPTICAL ANTENNA

This application is a National Filing pursuant to 35 U.S.C. 371 based upon International Application No. PCT/JP03/01034, filed Jan. 31, 2003.

TECHNICAL FIELD

The present invention relates to an optical antenna for transmitting and receiving a laser beam to and from space.

BACKGROUND ART

A conventional optical antenna controls the transmitting and receiving direction of a laser beam by having a position adjuster for three-dimensionally aligning the position of an optical fiber with the imaging lens of an optical system, and a gimbal mechanism for controlling movement of a casing that accommodates the optical antenna (see, the following Relevant Reference 1).

Relevant Reference 1: Japanese patent application laid-open No. 10-233738/1998 (see, paragraphs [0018]–[0022], and FIG. 2)

With the foregoing configuration, the conventional optical antenna can control the transmitting and receiving direction of the laser beam in accordance with the position of an object to be measured even though it changes its position. However, to control the transmitting and receiving direction of the laser beam, it is necessary to install the position adjuster and gimbal mechanism, which consist of complicated mechanical elements. Thus, it has a problem of increasing the cost and weight.

In addition, it must move and adjust the optical fiber and casing three-dimensionally every time the object to be measured alters its position, which presents a problem of a time lag depending on the positioning time of the position adjuster and gimbal mechanism.

The present invention is implemented to solve the foregoing problems. Therefore it is an object of the present invention to provide an optical antenna capable of setting a plurality of optical transmitting and receiving directions without mounting complicated mechanical elements.

DISCLOSURE OF THE INVENTION

According to one aspect of the present invention, there is provided an optical antenna including: arrangement means for mounting a plurality of optical transmitting and receiving means at different positions; and an optical system for transmitting, when an optical signal is radiated from the optical transmitting and receiving means, the optical signal to the space with refracting the optical signal to spherical waves, and for focusing, when an optical signal arrives from the space, the optical signal onto the optical transmitting and receiving means.

This offers an advantage of being able to set a plurality of optical transmitting and receiving directions without installing complicated mechanical elements.

BEST MODE FOR CARRYING OUT THE INVENTION

The best mode for carrying out the invention will now be described with reference to the accompanying drawings to explain the present invention in more detail.

Embodiment 1

Figure 1:
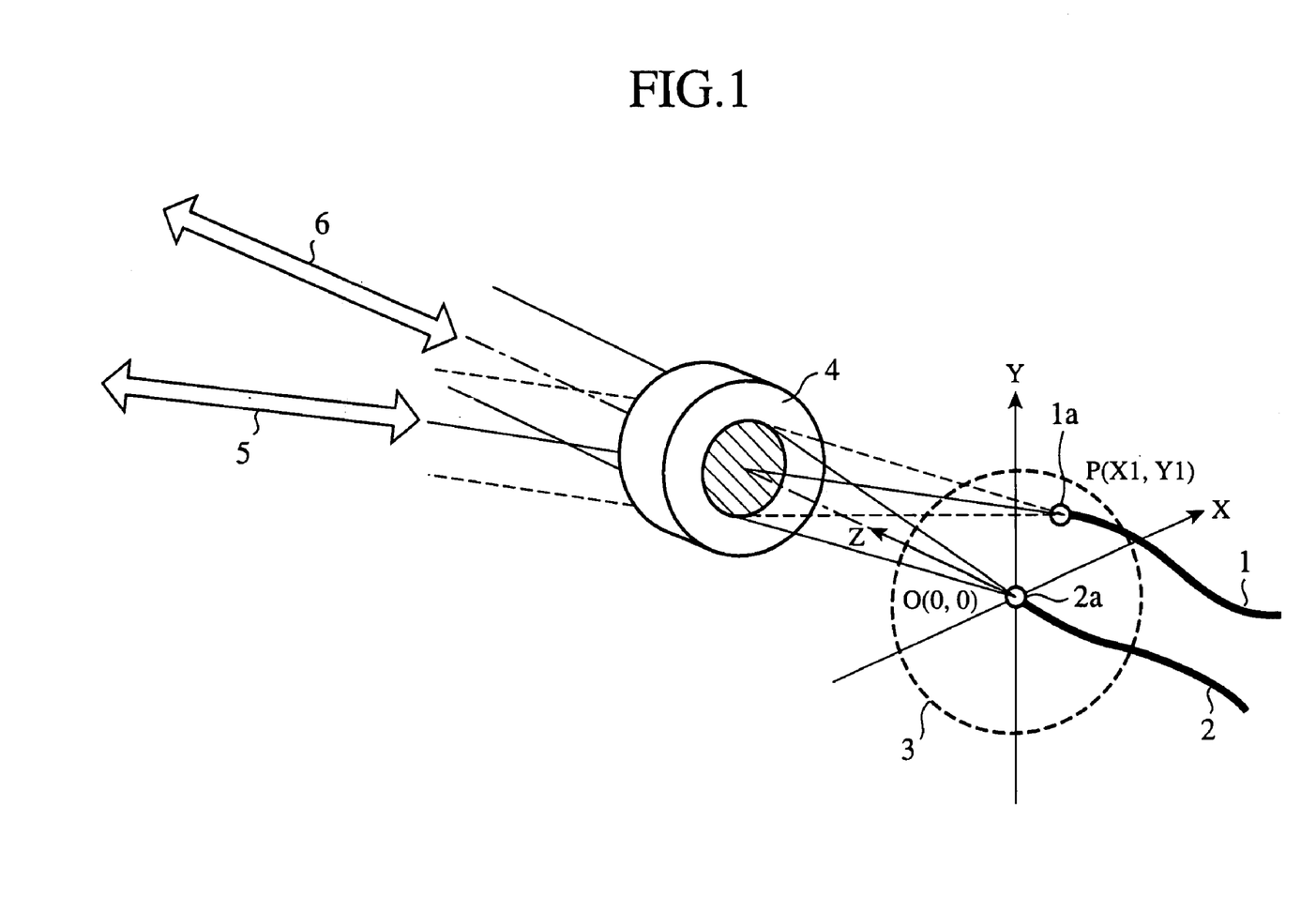
FIG. 1 is a diagram showing a configuration of an embodiment 1 of the optical antenna in accordance with the present invention.

FIG. 1 is a diagram showing a configuration of an embodiment 1 of the optical antenna in accordance with the present invention. In FIG. 1, optical fibers 1 and 2 of an optical transmitting and receiving section (optical transmitting and receiving means) radiate laser beams (optical signals) to be transmitted from the optical transmitting and receiving section to an optical transmitting and receiving system 4, and receive laser beams focused by the optical transmitting and receiving system 4 and supply them to the optical transmitting and receiving section.

An optical element mount 3 places fiber ends 1a and 2a of the optical fibers 1 and 2 at different positions on an image plane of the optical transmitting and receiving system 4. The optical element mount 3 constitutes an arrangement means. The optical transmitting and receiving system 4 consists of a transmission lens made from an imaging optical system such as a photographic objective, and transmits, when the fiber ends 1a and 2a of the optical fibers 1 and 2 radiate the laser beams, the laser beams to space by refracting them to spherical waves. In other words, the optical transmitting and receiving system 4 collimates the laser beams to parallel light rays toward the space. In addition, when laser beams arrive from the space, it focuses the laser beams onto the fiber ends 1a and 2a of the optical fibers 1 and 2.

Incidentally, the optical transmitting and receiving system 4 is constructed such that the aberration becomes small enough at an image height above the optical axes of the optical fibers 1 and 2.

Next, the operation will be described.

In the present embodiment 1, to obtain fixed two directions as the optical transmitting and receiving directions of the laser beams, the optical element mount 3 disposes the fiber ends 1a and 2a of the optical fibers 1 and 2 at two different positions on the image plane of the optical transmitting and receiving system 4.

For example, when the laser beam is radiated from the fiber end 1a of the optical fiber 1, the optical transmitting and receiving system 4 collimates the laser beam to a parallel light ray, and emits the laser beam in the optical transmitting and receiving direction 5 toward the space.

When a laser beam is radiated from the fiber end 2a of the optical fiber 2, the optical transmitting and receiving system 4 collimates the laser beam into a parallel light ray, and emits the laser beam in the optical transmitting and receiving direction 6 toward the space.

On the contrary, when a laser beam in the optical transmitting and receiving direction 5 arrives from the space, the optical transmitting and receiving system 4 focuses the laser beam onto the fiber end 1a of the optical fiber 1. Thus, the laser beam is launched into the fiber end 1a of the optical fiber 1 to be received by the optical transmitting and receiving section connected to the optical fiber 1.

In addition, when a laser beam in the optical transmitting and receiving direction 6 arrives from the space, the optical transmitting and receiving system 4 focuses the laser beam onto the fiber end 2a of the optical fiber 2. Thus, the laser beam is launched into the fiber end 2a of the optical fiber 2 to be received by the optical transmitting and receiving section connected to the optical fiber 2.

Here, the focal length f of the optical transmitting and receiving system 4 is determined by the following expressions (1) and (1).

$$NA = \sin \theta \quad (1)$$

$$f = D/(2 \cdot NA) \quad (2)$$

where D is the diameter of the laser beam collimated by the optical transmitting and receiving system 4, and $\theta$ is the half angle of the angle of radiation of the laser beam radiated from the fiber ends 1a and 2a of the optical fibers 1 and 2.

In addition, the optical transmitting and receiving directions 5 and 6 are determined by the positions of the fiber ends 1a and 2a of the optical fibers 1 and 2.

More specifically, assume as in FIG. 1 that an orthogonal coordinate system (X, Y) is placed on the image plane of the optical transmitting and receiving system 4, and that the z axis is established in the direction looking at the optical transmitting and receiving system 4 from the origin O(0, 0). Since the fiber end 1a of the optical fiber 1 is placed on the optical axis, the direction cosine $\vec{a}$ (x, y, z) of the optical transmitting and receiving direction 5 is given by the following expression (3).

$$\vec{a} = (0, 0, 1) \quad (3)$$

Besides, assume that the coordinates of the fiber end 2a of the optical fiber 2 on the XY plane are given by P(X1, Y1), then the direction cosine $\vec{b}$ (x, y, z) of the optical transmitting and receiving direction 6 is given by the following expression (4).

$$\vec{b} = \left( \frac{-X1}{\sqrt{X1^2 + Y1^2 + f^2}}, \frac{-Y1}{\sqrt{X1^2 + Y1^2 + f^2}}, \frac{f}{\sqrt{X1^2 + Y1^2 + f^2}} \right) \quad (4)$$

As described above, the present embodiment 1 is configured such that it includes the optical element mount 3 for disposing the fiber ends 1a and 2a of the optical fibers 1 and 2 at different positions, and the optical transmitting and receiving system 4 for collimating, when the laser beams are radiated from the fiber ends 1a and 2a, the laser beams to the parallel light rays toward the space, and for focusing, when the laser beams arrive from the space, the laser beams onto the fiber ends 1a and 2a. As a result, it offers an advantage of being able to set the two optical transmitting and receiving directions 5 and 6 without installing the complicated mechanical elements.

In addition, since the optical antenna need not install the complicated mechanical elements, it can reduce its size, weight and cost. In addition, since it does not use mechanical drive, it can increase the reproducibility of the optical transmitting and receiving directions.

Although the optical element mount 3 disposes the fiber ends 1a and 2a of the optical fibers 1 and 2 constituting the optical transmitting and receiving section at different locations in the present embodiment 1, this is not essential. For example, the optical element mount 3 can dispose light sources or photo-detectors constituting the optical transmitting and receiving section. In this case, the optical transmitting and receiving section carries out only one of the transmission and reception of the laser beams.

Embodiment 2

Figure 2:
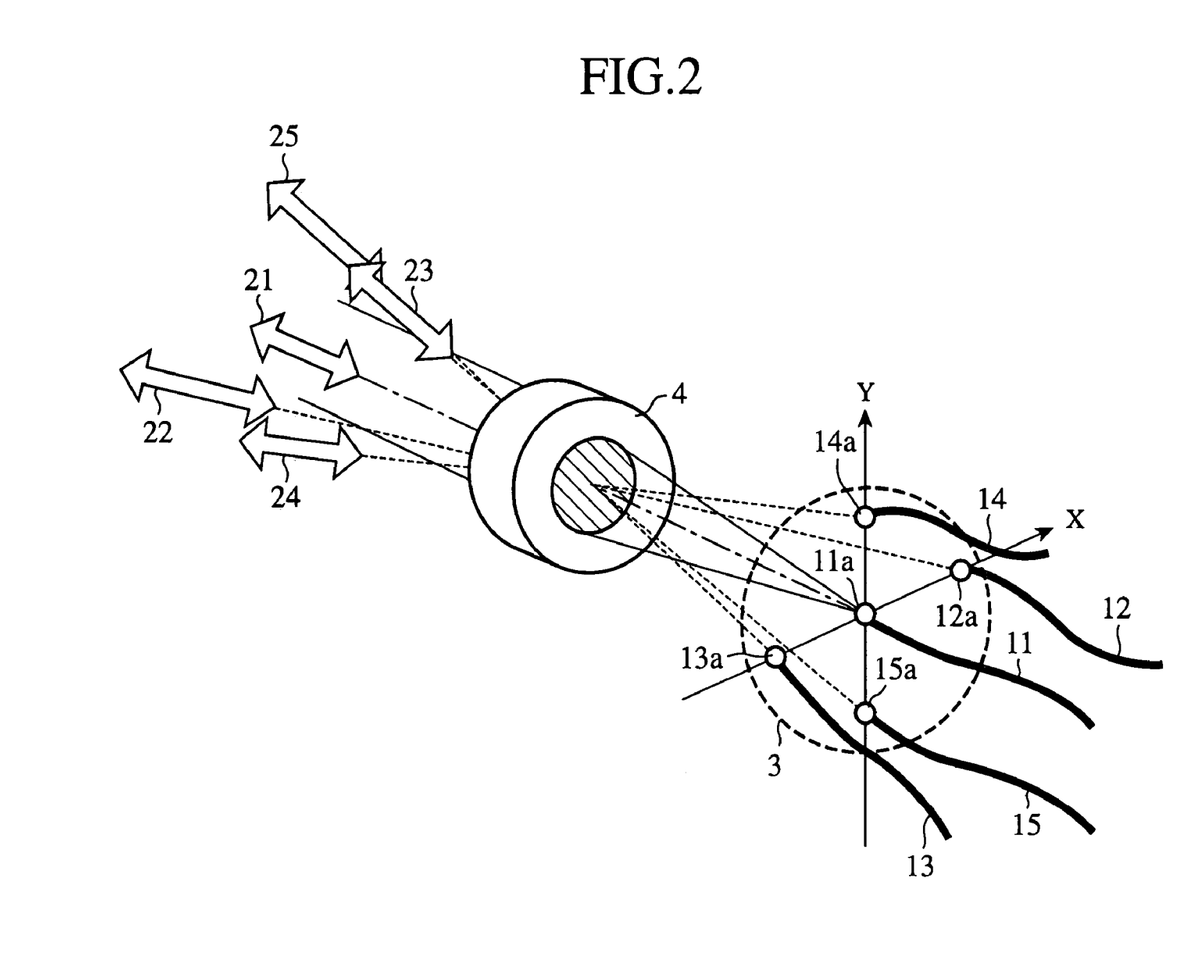
FIG. 2 is a diagram showing a configuration of an embodiment 2 of the optical antenna in accordance with the present invention.

FIG. 2 is a diagram showing a configuration of an embodiment 2 of the optical antenna in accordance with the present invention. In FIG. 2, since the same reference numerals designate the same or like portions to those of FIG. 1, their description will be omitted here.

Optical fibers 11–15 of an optical transmitting and receiving section radiate laser beams to be transmitted from the optical transmitting and receiving section to the optical transmitting and receiving system 4. At the same time, the optical fibers 11–15 receive the laser beams focused by the optical transmitting and receiving system 4, and supply them to the optical transmitting and receiving section.

Optical transmitting and receiving directions 21–25 are directions of the laser beams set by the optical antenna.

The foregoing embodiment 1 is described by way of example in which the laser beams have fixed two directions as the optical transmitting and receiving directions. However, when the optical element mount 3 disposes the fiber ends of three or more optical fibers, it is possible to set three or more directions as the optical transmitting and receiving directions of the laser beams.

In the example of FIG. 2, the optical element mount 3 has the fiber ends 11a–15a of five optical fibers 11–15 disposed thereon, thereby implementing five optical transmitting and receiving directions 21–25.

Embodiment 3

Figure 3:
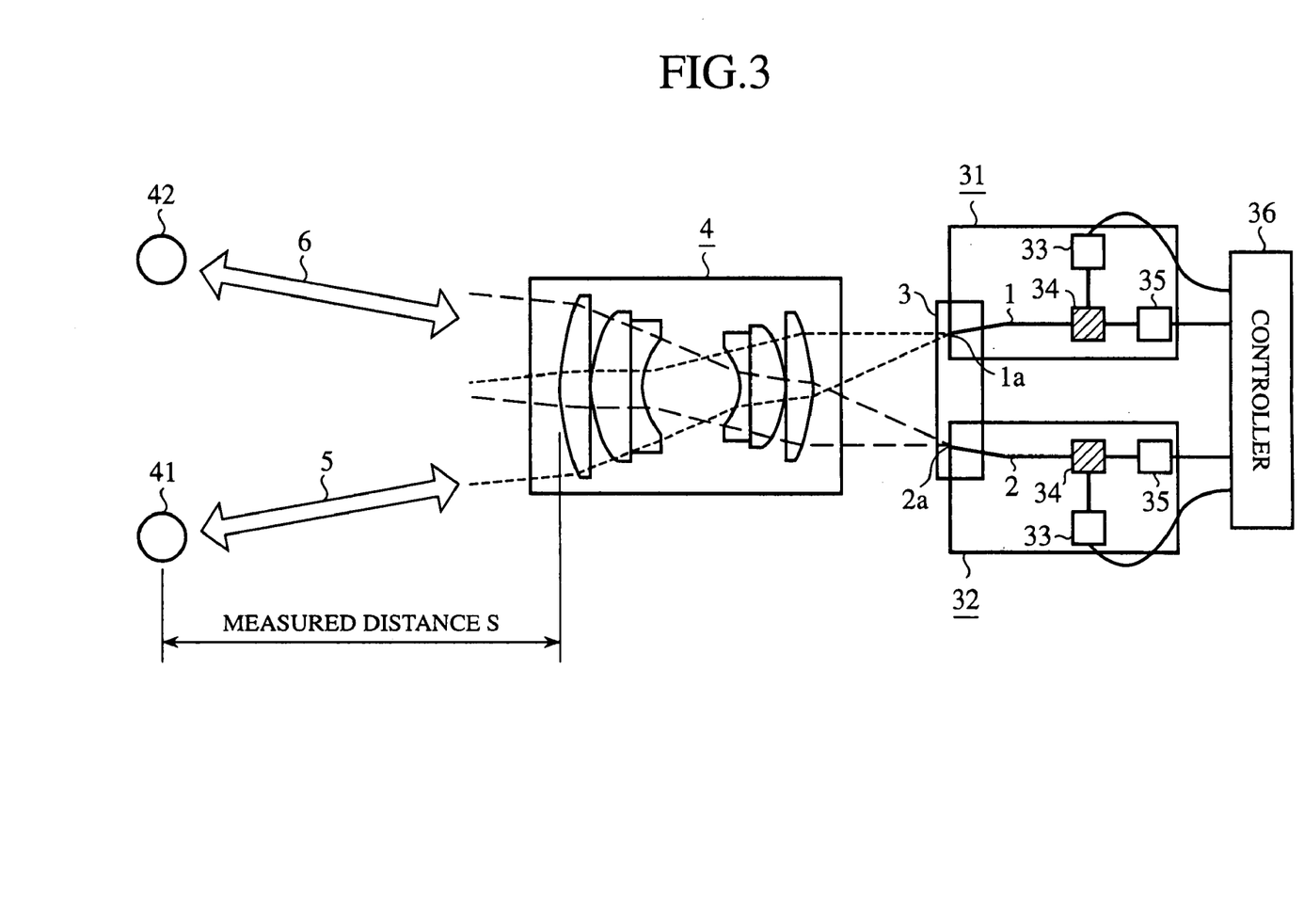
FIG. 3 is a diagram showing a configuration of an embodiment 3 of the optical antenna in accordance with the present invention.

FIG. 3 is a diagram showing a configuration of an embodiment 3 of the optical antenna in accordance with the present invention. In FIG. 3, since the same reference numerals designate the same or like portions to those of FIG. 1, their description will be omitted here. The optical antenna of FIG. 3 is applied to a wind speed measuring LIDAR (Light Detection And Ranging) apparatus.

Optical transmitting and receiving sections 31 and 32 constitute an optical transmitting and receiving means for radiating outgoing laser beams toward the space, and for receiving incoming laser beams from the space. Laser light sources 33 of the optical transmitting and receiving sections 31 and 32 each emit a laser beam under the control of a controller 36. Optical path bifurcating sections 34 divide the optical fibers 1 and 2 into two branches each. Optical receivers 35 receive laser beams from the optical fibers 1 and 2, convert the laser beams into electric signals, and supply them to the controller 36, respectively. The controller 36 controls the driving of the laser light source 33, and measures the wind speed at measurement points 41 and 42 (object to be measured) by monitoring electric signals output from the optical receivers 35.

Incidentally, the optical transmitting and receiving system 4 of FIG. 3 has a double Gaussian configuration.

Next, the operation will be described.

When measuring the wind speeds at two different measurement points 41 and 42 at the same time, the controller 36 drives the laser light sources 33 of the optical transmitting and receiving sections 31 and 32 simultaneously.

Receiving the driving command from the controller 36, the laser light sources 33 of the optical transmitting and receiving sections 31 and 32 emit laser beams. The laser beams emitted from the laser light sources 33 are transmitted through the optical path bifurcating sections 34, and are radiated from the fiber ends 1a and 2a of the optical fibers 1 and 2 to the optical transmitting and receiving system 4.

When the laser beams are radiated from the fiber ends 1a and 2a of the optical fibers 1 and 2, the optical transmitting and receiving system 4 collimates the laser beams to parallel light rays, and outputs the laser beams to the measurement points 41 and 42. Here, the optical transmitting and receiving directions 5 and 6 of the laser beams output from the optical transmitting and receiving system 4 are determined by the arrangement of the fiber ends 1a and 2a on the optical element mount 3 as in the foregoing embodiment 1. Thus, it is assumed that the optical element mount 3 disposes the fiber ends 1a and 2a in such a manner that the laser beams are focused onto the measurement points 41 and 42.

In addition, since the optical transmitting and receiving system 4 carries out highly accurate aberration correction, the laser beams passing through the optical transmitting and receiving system 4 become highly accurate spherical waves.

The laser beams focused onto the measurement points 41 and 42 are scattered by dusts at the measurement points 41 and 42 so that parts of the laser beams return to the optical transmitting and receiving system 4.

When the parts of the laser beams return, the optical transmitting and receiving system 4 focuses the laser beam in the optical transmitting and receiving direction 5 onto the fiber end 1a of the optical fiber 1, and the laser beam in the optical transmitting and receiving direction 6 onto the fiber end 2a of the optical fiber 2.

Thus, the laser beam in the optical transmitting and receiving direction 5 is launched into the fiber end 1a of the optical fiber 1, and reaches the optical receiver 35 via the optical path bifurcating section 34.

Likewise, the laser beam in the optical transmitting and receiving direction 6 is launched into the fiber end 2a of the optical fiber 2, and reaches the optical receiver 35 via the optical path bifurcating section 34.

Receiving the laser beams from the optical fibers 1 and 2, the optical receivers 35 of the optical transmitting and receiving sections 31 and 32 convert the laser beams to electric signals and supply them to the controller 36.

Receiving the electric signals from the optical receivers 35 of the optical transmitting and receiving sections 31 and 32, the controller 36 measures the wind speeds of the measurement points 41 and 42 by monitoring the electric signals.

As described above, the present embodiment 3 can set the two optical transmitting and receiving directions 5 and 6 without installing the complicated mechanical elements as in the foregoing embodiment 1. Thus, it offers an advantage of being able to measure the wind speeds in the two directions without increasing the weight or cost.

Although the present embodiment 3 is described by way of example that measures the wind speeds in two directions, this is not essential. For example, if the optical element mount 3 disposes fiber ends of three or more optical fibers thereon as in the foregoing embodiment 2, it can measure the wind speeds in three or more directions.

In addition, although the present embodiment 3 is described by way of example that measures the wind speeds in the two directions simultaneously, it is not essential to measure the wind speeds in the two directions simultaneously. For example, the controller 36 can appropriately drive one of the optical receiver 35 of the optical transmitting and receiving section 31 and the optical receiver 35 of the optical transmitting and receiving section 32 on an as needed basis.

Embodiment 4

Figure 4:
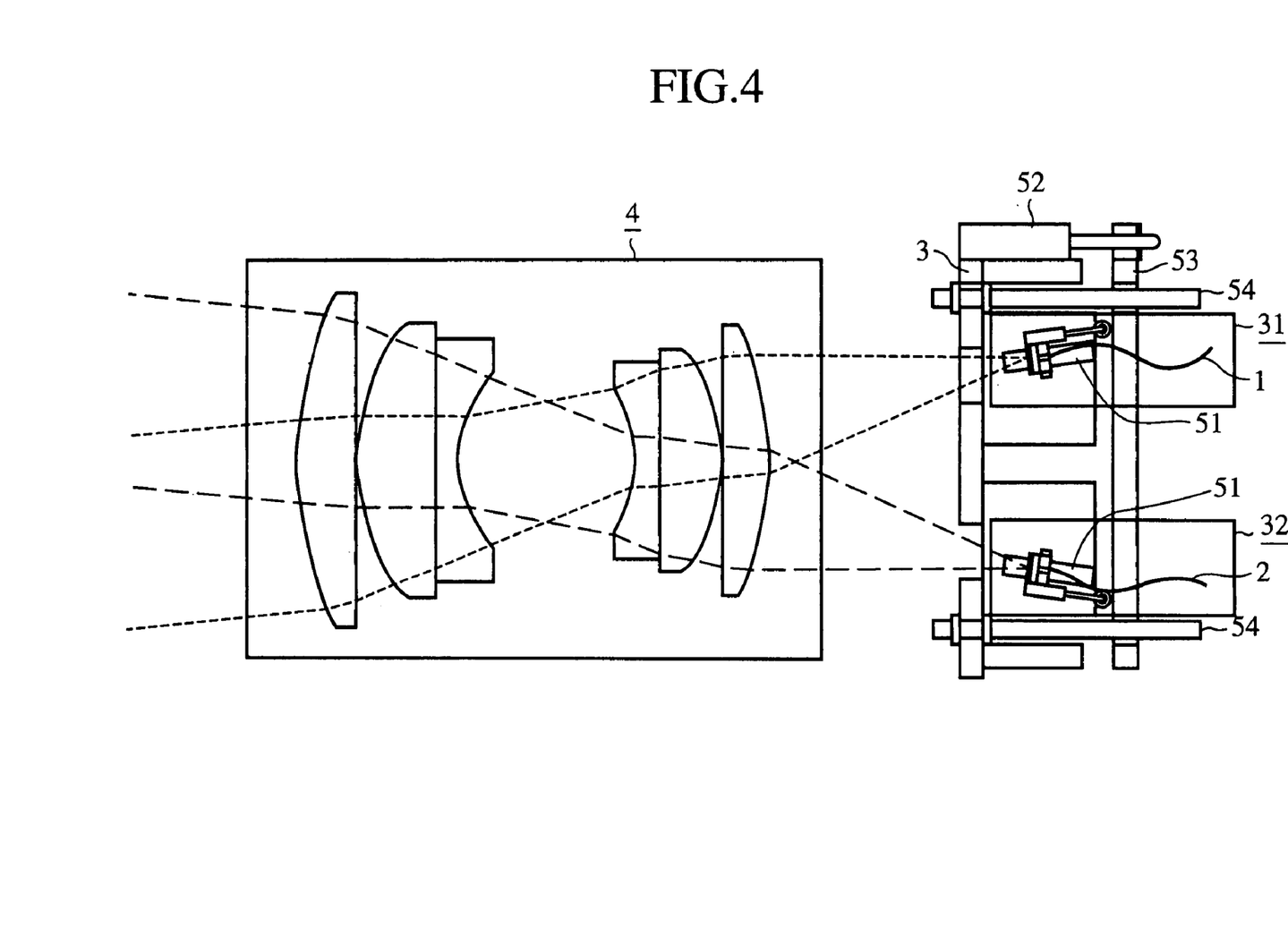
FIG. 4 is a diagram showing a configuration of an embodiment 4 of the optical antenna in accordance with the present invention.

FIG. 4 is a diagram showing a configuration of an embodiment 4 of the optical antenna in accordance with the present invention. In FIG. 4, since the same reference numerals designate the same or like portions to those of FIG. 3, their description will be omitted here.

Rectilinear rails 51 have their moving components fixing the optical fibers 1 and 2, and their guides fixed to the optical element mount 3. A moving plate 53 is supported by rods 54 via bearings, and moves in the direction along the rods 54 when driven by a rectilinear actuator 52.

Here, the rectilinear rails 51, rectilinear actuator 52, moving plate 53 and rods 54 constitute a driving mechanism for changing the positions of the fiber ends 1a and 2a.

Although the foregoing embodiment 3 is described by way of example of the optical antenna capable of setting any desired optical transmitting and receiving directions, it cannot change a measured distance S.

However, applying the technique of focusing in accordance with the distance of a subject in photography enables the same optical transmitting and receiving system 4 to measure different distances.

In the present embodiment 4, the optical antenna capable of measuring different distances will be described.

First, when taking a picture, the distance between the lens and dry plate is adjusted to bring the subject into focus. The amount of the shift can be calculated if the distance of the subject is known.

Likewise, the present embodiment 4 controls the measured distance S and the positions of the fiber ends 1a and 2a such that they match the image forming relation.

More specifically, controlling the rectilinear actuator 52 enables the moving plate 53 to shift in the direction along the rods 54, and the contact of the moving plate 53 with the moving components of the rectilinear rails 51 enables the fiber ends 1a and 2a to shift their positions in the directions along the guides of the rectilinear rails 51.

Thus controlling the rectilinear actuator 52 appropriately enables the fiber ends 1a and 2a to change their positions to desired locations.

The present embodiment 4 makes it possible not only to set the optical transmitting and receiving directions to any desired directions, but also to change the distance to the measurement points. Accordingly, it offers an advantage of being able to increase the flexibility of the measurement points.

Embodiment 5

Figure 5:
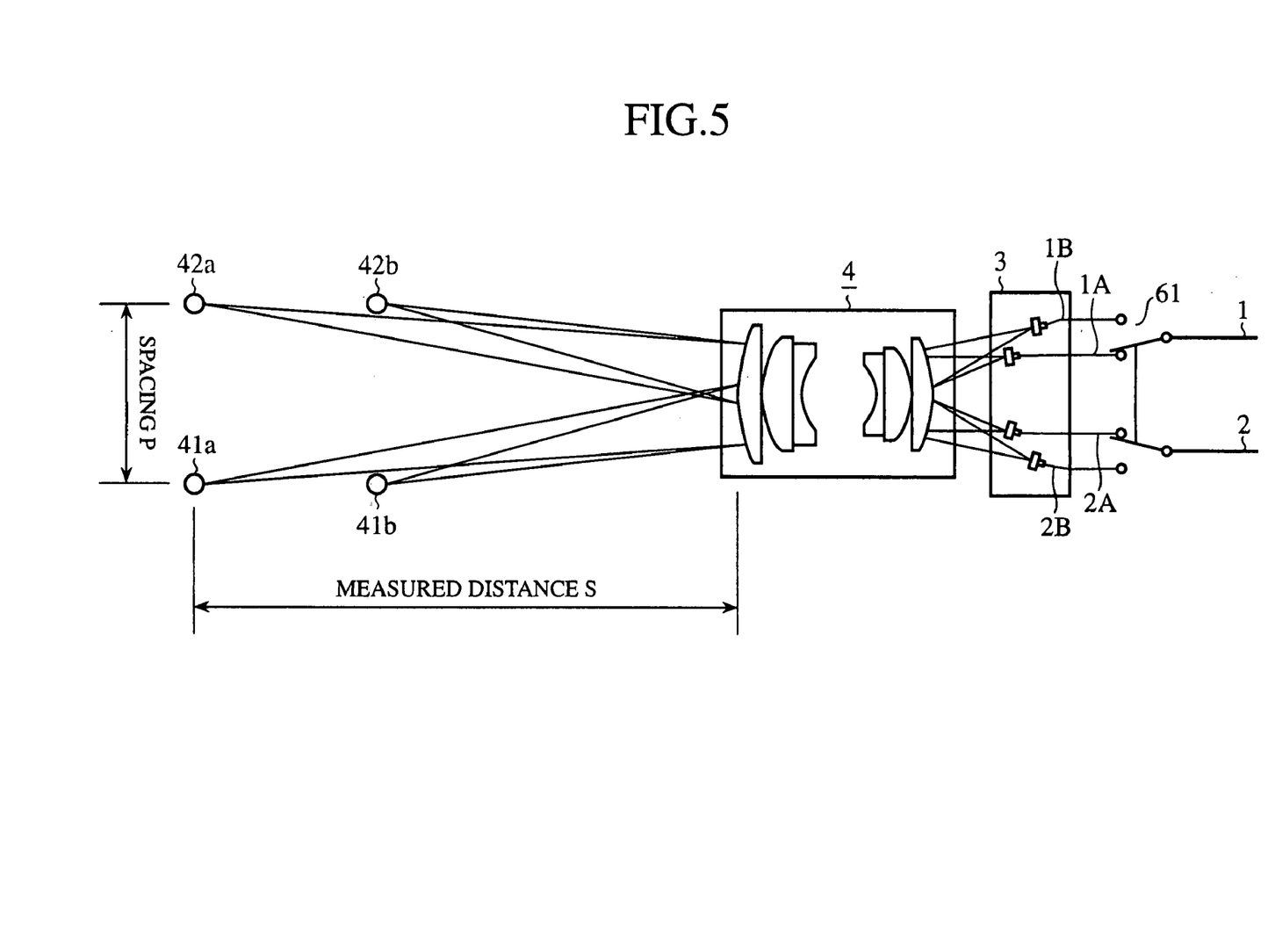
FIG. 5 is a diagram showing a configuration of an embodiment 5 of the optical antenna in accordance with the present invention.

FIG. 5 is a diagram showing a configuration of an embodiment 5 of the optical antenna in accordance with the present invention. In FIG. 5, since the same reference numerals designate the same or like portions to those of FIG. 3, their description will be omitted here.

The fiber ends of optical fibers 1A and 1B are disposed at different positions of the optical element mount 3. Likewise, the fiber ends of optical fibers 2A and 2B are disposed at different positions of the optical element mount 3. An optical device switching section 61 connects, when measuring the wind speeds at far measurement points 41a and 42a, the optical fibers 1 and 2 to optical fibers 1A and 2A, respectively, and connects, when measuring the wind speeds at near measurement points 41b and 42b, the optical fibers 1 and 2 to optical fibers 1B and 2B, respectively. Here, the optical device switching section 61 constitutes a selecting means.

Although the foregoing embodiment 4 is described by way of example that changes the measured distance S by the driving mechanism, the driving mechanism installed can results in an increase in weight and cost. In addition, since only the distance to the measurement points is varied with fixing the optical transmitting and receiving directions 5 and 6, the spacing between two measurement points to be measured simultaneously varies in proportion to the measured distance S. In the measurement of the wind speed, the variation in the spacing between the measurement points can cause a measurement error.

In the present embodiment 5, the optical antenna will be described which can vary the measured distance S without using the driving mechanism, and maintain the spacing between the two measurement points independently of the measured distance S.

The optical element mount 3 disposes the fiber ends of the optical fibers 1A and 2A in such a manner that the laser beams radiated from the optical transmitting and receiving system 4 are focused onto the far measurement points 41a and 42a, and disposes the fiber ends of the optical fibers 1B and 2B in such a manner that the laser beams radiated from the optical transmitting and receiving system 4 are focused onto the near measurement points 41b and 42b.

The optical device switching section 61 connects, when measuring the wind speeds at the far measurement points 41a and 42a, the optical fibers 1 and 2 to the optical fibers 1A and 2A, respectively, and connects, when measuring the wind speeds at near measurement points 41b and 42b, the optical fibers 1 and 2 to the optical fibers 1B and 2B, respectively.

The present embodiment 5 can set the optical transmitting and receiving directions at desired directions, and vary the distances to the measurement points. Thus, it offers an advantage of being able to increase the flexibility of the measurement points.

In addition, since it can vary the measured distance S without using the driving mechanism, it has no time lag depending on the positioning time of the driving mechanism. Accordingly, it offers an advantage of being able to switch the measured distance instantaneously.

Furthermore, since it does not include the driving mechanism, it offers an advantage of being able to reduce the weight and cost of the apparatus.

Embodiment 6

Figure 6:
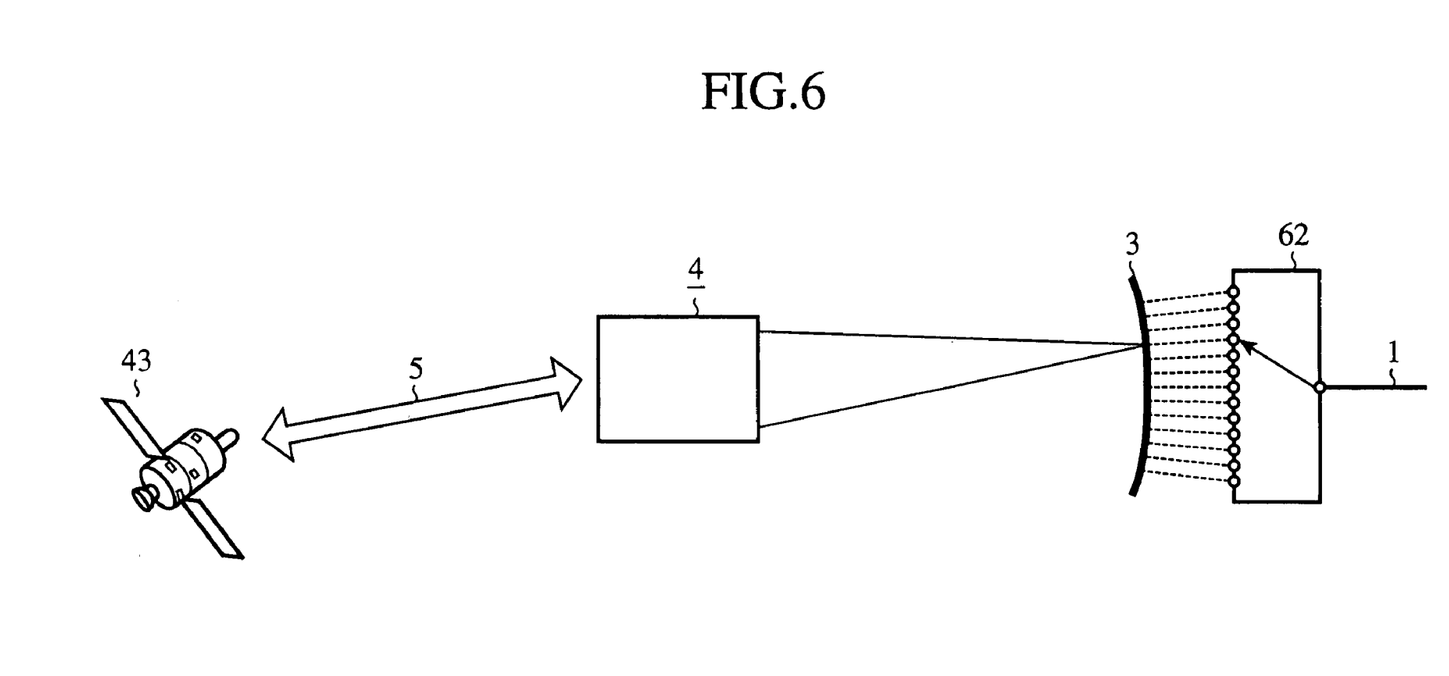
FIG. 6 is a diagram showing a configuration of an embodiment 6 of the optical antenna in accordance with the present invention.

FIG. 6 is a diagram showing a configuration of an embodiment 6 of the optical antenna in accordance with the present invention. In FIG. 6, since the same reference numerals designate the same or like portions to those of FIG. 3, their description will be omitted here.

An optical device switching section 62 selects an optical fiber n corresponding to the position of a moving target 43, an object to be measured, from a plurality of optical fibers n (n=1, 2, . . . , N) disposed on the optical element mount 3, and connects the optical fiber n to the optical fiber 1. Here, the optical device switching section 62 constitutes a selecting means.

The foregoing embodiment 5 is described by way of example in which the optical device switching section 61 switches the connection targets of the optical fibers 1 and 2 when changing the distance to the measurement point. However, when the moving target 43 is changing its position and the angle at which the transmitting and receiving optical system 4 looks at the moving target 43 varies from time to time, a configuration is also possible in which the optical device switching section 62 switches the connection target of the optical fiber 1 in such a manner that the optical transmitting and receiving direction 5 agrees with the angle looking at the moving target 43.

The present embodiment 6 can capture the moving target 43 whenever necessary without the driving mechanism. Accordingly, it offers an advantage of being able to reduce the weight and cost of the apparatus. In addition, since it has no time lag depending on the positioning time of the driving mechanism, it offers an advantage of being able to continually trace the moving target 43 even if the moving target 43 moves at high speed.

Embodiment 7

Figure 7:
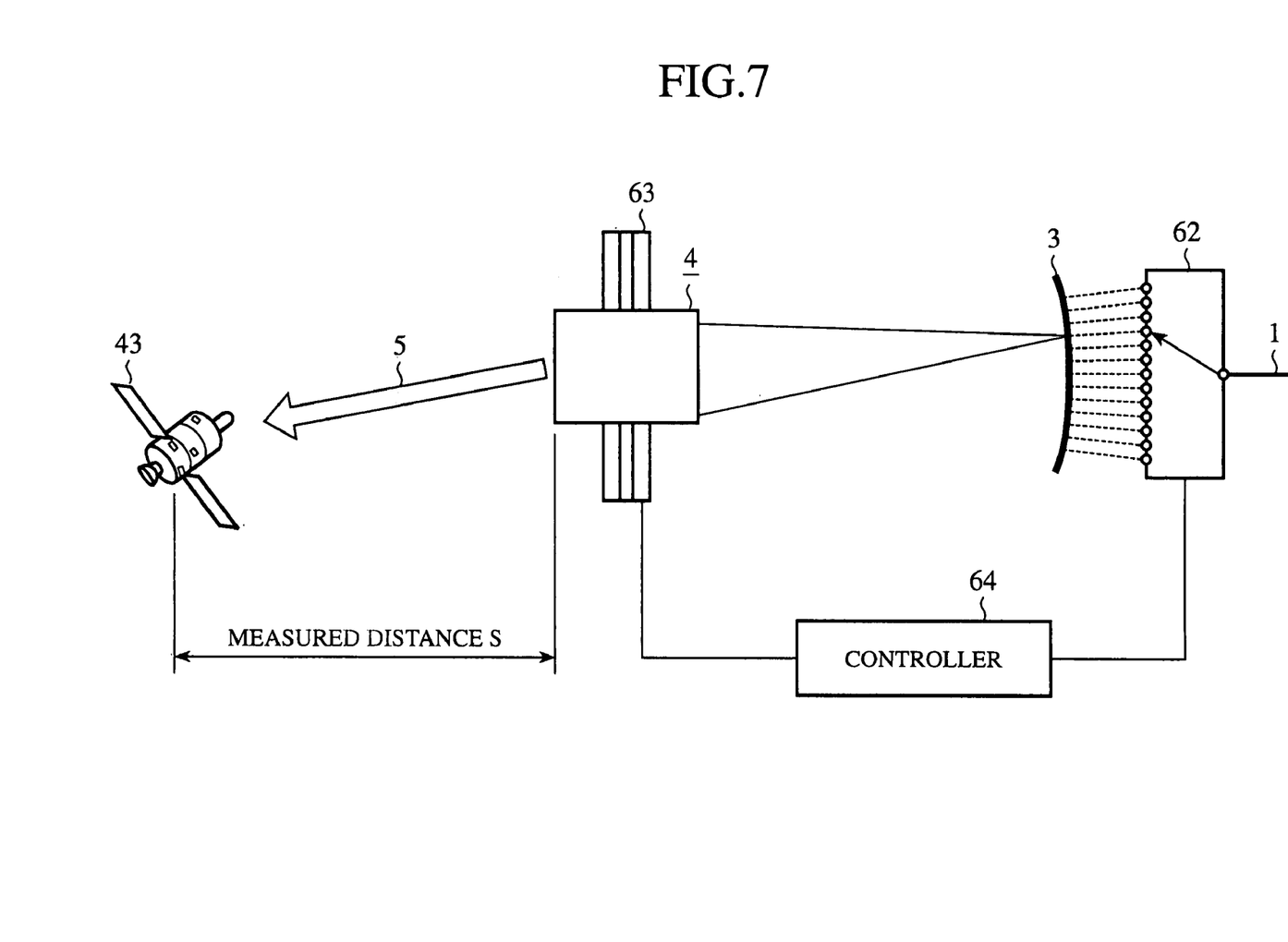
FIG. 7 is a diagram showing a configuration of an embodiment 7 of the optical antenna in accordance with the present invention.

FIG. 7 is a diagram showing a configuration of an embodiment 7 of the optical antenna in accordance with the present invention. In FIG. 7, since the same reference numerals designate the same or like portions to those of FIG. 6, their description will be omitted here.

A controller 64 controls at least one of the optical device switching section 62 and a rectilinear stage 63 in response to the changes in the position of the moving target 43 to enable the transmitting and receiving optical system 4 to vary its position or angle. Here, the controller 64 and rectilinear stage 63 constitute the selecting means.

The foregoing embodiment 6 is described by way of example in which the optical device switching section 62 switches the connection target of the optical fiber 1 in such a manner that the optical transmitting and receiving direction 5 agrees with the angle looking at the moving target 43. However, since the density of the optical fibers n (the spacings between them) that can be mounted on the optical element mount 3 is physically limited, it is unavoidable that the angle of the optical transmitting and receiving direction 5 becomes discrete. Accordingly, as the distance to the moving target 43 increases, the time period that prevents the measurement increases, so that the probability of losing track of the moving target 43 increases.

The present embodiment 7 is designed such that it can reduce the probability of losing track of the moving target 43 by reducing the duration that prevents the measurement even through the moving target 43 is placed at a distance.

The operation will be described in more detail.

When the measured distance S to the moving target 43 is short, the time period is also short which prevents the measurement because of the discrete angle of the optical transmitting and receiving direction 5. In this case, the controller 64 controls the optical device switching section 62 so as to switch the connection target of the optical fiber 1 as in the foregoing embodiment 6.

On the other hand, when the measured distance S to the moving target 43 is long, the time period also becomes long which prevents the measurement because of the discrete angle of the optical transmitting and receiving direction 5, thereby increasing the probability of losing track of the moving target 43. In this case, the controller 64 controls the rectilinear stage 63 to move the optical transmitting and receiving system 4 by a minute amount (to move by an amount corresponding to an angle smaller than the pitch of the angle of the optical transmitting and receiving direction 5 due to the switching of the optical fibers n), thereby tracking the moving target 43.

Then, when the optical transmitting and receiving direction 5 shifts by an amount equal to the difference from the optical transmitting and receiving direction of the adjacent optical fiber n−1 (or n+1), the optical device switching section 62 switches the connection target of the optical fiber 1 to the adjacent optical fiber n−1 (or n+1), and returns the rectilinear stage 63 to its original position.

The present embodiment 7 offers an advantage of being able to reduce the probability of losing track of the moving target 43 by reducing the time period which prevents the measurement even if the moving target 43 is at a considerable distance.

Incidentally, although the present embodiment 7 requires the driving mechanism, the control of the rectilinear stage 63 is only for the purpose of making up for the control of the optical transmitting and receiving direction 5 by the optical device switching section 62. Accordingly, the range of carrying out the driving control is much smaller than that of the conventional apparatus, and hence the present embodiment 7 has little influence on the weight and cost.

Embodiment 8

Figure 8:
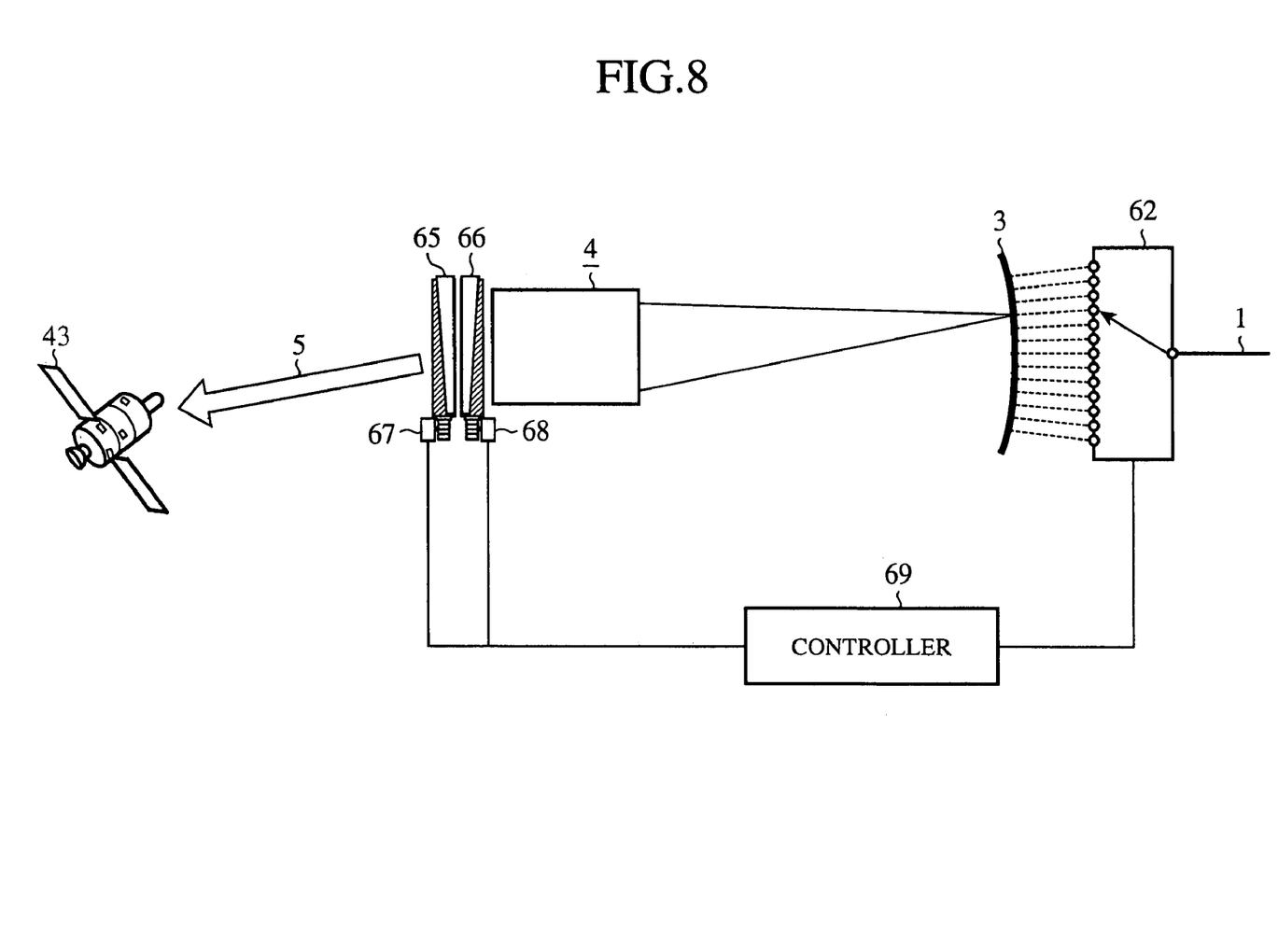
FIG. 8 is a diagram showing a configuration of an embodiment 8 of the optical antenna in accordance with the present invention.

FIG. 8 is a diagram showing a configuration of an embodiment 8 of the optical antenna in accordance with the present invention. In FIG. 8, since the same reference numerals designate the same or like portions to those of FIG. 6, their description will be omitted here.

Stepping motors 67 and 68 carry out rotation driving of wedge prisms 65 and 66, which are installed on the moving target 43 side of the optical transmitting and receiving system 4, under instructions from the controller 69. The controller 69 controls the stepping motors 67 and 68 in accordance with the changes in the position of the moving target 43. Here, the stepping motors 67 and 68 and controller 69 constitute the selecting means.

The foregoing embodiment 7 is described by way of example in which the controller 64 controls the rectilinear stage 63 appropriately to compensate for the control resolution limitations of the optical transmitting and receiving direction 5 by the optical device switching section 62. However, a configuration is also possible in which the controller 69 controls the stepping motors 67 and 68 in accordance with the changes in the position of the moving target 43 to adjust the angles of refraction of the laser beams with the wedge prisms 65 and 66, thereby making fine adjustment of the optical transmitting and receiving direction 5. The configuration offers the similar advantage as that of the foregoing embodiment 7.

Incidentally, although the present embodiment 8 requires the driving mechanism, the control of the stepping motors 67 and 68 is only for the purpose of making up for the control of the optical transmitting and receiving direction 5 by the optical device switching section 62. Accordingly, the range of carrying out the driving control is much smaller than that of the conventional apparatus, and hence the present embodiment 8 has little influence on the weight and cost.

Embodiment 9

Figure 9:
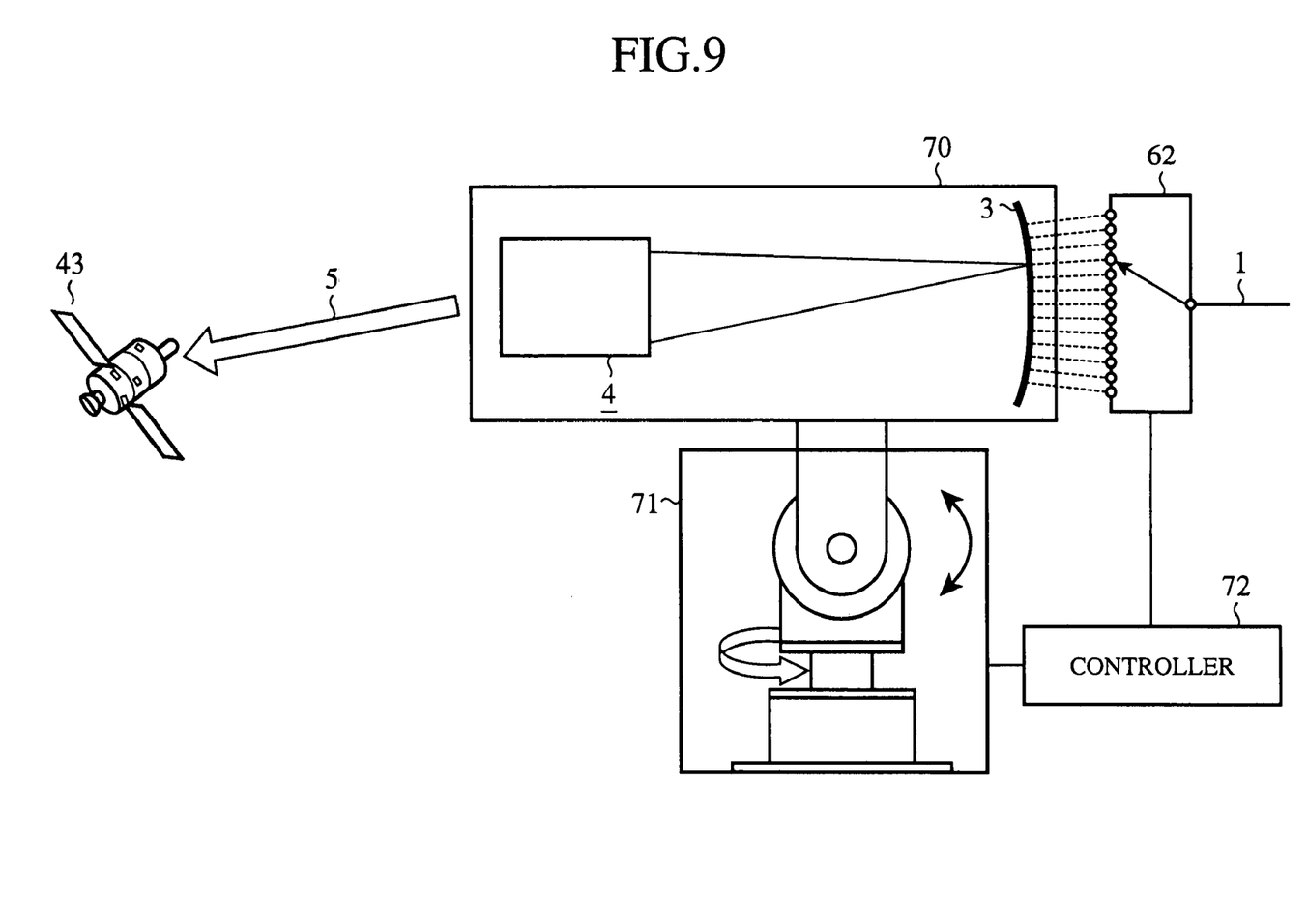
FIG. 9 is a diagram showing a configuration of an embodiment 9 of the optical antenna in accordance with the present invention.

FIG. 9 is a diagram showing a configuration of an embodiment 9 of the optical antenna in accordance with the present invention. In FIG. 9, since the same reference numerals designate the same or like portions to those of FIG. 6, their description will be omitted here.

A casing 70 fixes and supports the optical transmitting and receiving system 4 and the optical element mount 3, and a dual-axis gimbal driving mechanism 71 varies the installation angle of the casing 70 under the instructions from the controller 72. The controller 72 controls the dual-axis gimbal driving mechanism 71 in response to the position changes of the moving target 43. Here, the dual-axis gimbal driving mechanism 71 and the controller 72 constitute the selecting means.

The foregoing embodiment 7 is described by way of example in which the controller 64 controls the rectilinear stage 63 appropriately to compensate for the control resolution limitations of the optical transmitting and receiving direction 5 by the optical device switching section 62. However, a configuration is also possible in which the controller 72 controls the dual-axis gimbal driving mechanism 71 in accordance with the changes in the position of the moving target 43 to vary the installation angle of the casing 70, thereby making fine adjustment of the optical transmitting and receiving direction 5. The configuration offers the similar advantage as that of the foregoing embodiment 7.

Incidentally, although the present embodiment 9 requires the driving mechanism, the control of the dual-axis gimbal driving mechanism 71 is only for the purpose of making up for the control of the optical transmitting and receiving direction 5 by the optical device switching section 62. Accordingly, the range of carrying out the driving control is much smaller than that of the conventional apparatus, and hence the present embodiment 9 has little influence on the weight and cost.

Embodiment 10

Figure 10:
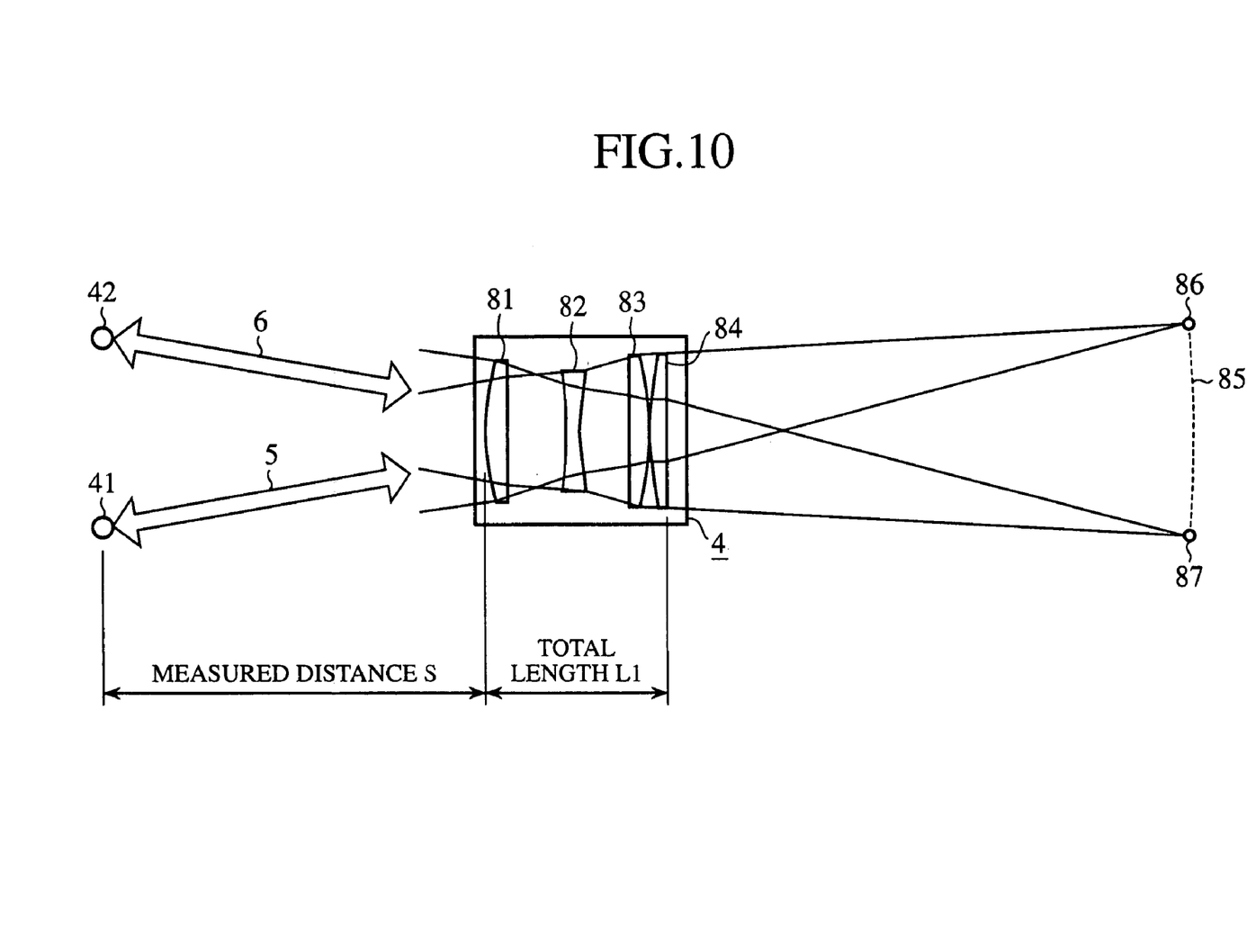
FIG. 10 is a diagram showing a partial configuration of an embodiment 10 of the optical antenna in accordance with the present invention.

FIG. 10 is a diagram showing a configuration of an embodiment 10 of the optical antenna in accordance with the present invention. In FIG. 10, since the same reference numerals designate the same or like portions to those of FIG. 3, their description will be omitted here.

A single lens 81 constitutes a first lens having positive refraction power; a single lens 82 constitutes a second lens having negative refraction power; a single lens 83 constitutes a third lens having positive refraction power; and a single lens 84 constitutes a fourth lens having positive refraction power.

The reference numeral 85 designates the image plane of the optical transmitting and receiving system 4; and reference numerals 86 and 87 each designate a focus of the optical transmitting and receiving system 4.

Although not mentioned in particular in the foregoing embodiments 1–9, to apply the optical antenna to a LIDAR apparatus, for example, it is necessary to transmit and receive large-diameter laser beams to measure the measurement points 41 and 42 at a considerable distance. For example, when the distance to the measurement points 41 and 42 is a few hundred meters, the transmitting and receiving optical system 4 is required which can transmit and receive the laser beams with a diameter of about 100 mm. Accordingly, a commercially available imaging optical system is not always applicable, which can require specific design and increase the cost of manufacturing.

In addition, as for the transmitting and receiving optical system 4 of the foregoing embodiments 3–5, since they only magnify the imaging optical system, the diameter of the lenses is nearly twice the diameter of the laser beams to be transmitted and received, which presents a problem of weight and size.

The present embodiment 10 tries to reduce the size and weight of the transmitting and receiving optical systems 4 used in the foregoing embodiments 1–9.

The optical transmitting and receiving system 4 of FIG. 10 is configured such that it carries out the measurement under the following conditions.

measured distance S 10 m to infinite distance measured direction<±10° transmitted and received beam diameter 100 mm

NA 0.1

Generally, in the design of lenses, the less the restrictions, the more the imaging performance is improved as long as the number of the lenses is the same because higher aberration correction becomes possible.

On the other hand, if the imaging performance is the same, as the restrictions reduce, the number of the lenses can be reduced.

In view of this, the optical transmitting and receiving system 4 is designed by removing the following restrictions as compared with the photographic objective.

(a) Although the photographic objective must focus on the flat dry plate, the image plane 85 of the transmitting and receiving optical system 4 accepts a curvature.

(b) Although the photographic objective must correct chromatic aberration in a wide wavelength range, the transmitting and receiving optical system 4 carries out the aberration correction at only the wavelength of the laser beam used.

In addition, to reduce the weight of the optical transmitting and receiving system 4 and to improve the ease of its manufacturing, the following design ideas are exploited.

(c) The lenses 81, 83 and 84 are made plano-convex to facilitate manufacturing.

(d) As the length L1 from the objective side of the lens 81 to the image plane side of the lens 84 increases, the bundle of rays deviate more from the optical axis, resulting in an increase in the lens diameter. Thus, the effective diameter of the lenses 81–84 is limited to 1.35 or less times the diameter of the laser beam by making the total length L1 ⅓ or less of the focal length in the optical transmitting and receiving system 4.

According to the present embodiment 10, the optical transmitting and receiving system 4 includes four lenses, and their diameter is limited to 1.35 or less times the diameter of the laser beam. Thus, it can implement a compact, lightweight and low cost apparatus.

In addition, since three of the four lenses are plano-convex, the present embodiment can facilitate manufacturing, and implement low cost.

INDUSTRIAL APPLICABILITY

As described above, the optical antenna in accordance with the present invention is suitable for LIDAR apparatuses and optical communication systems which must reduce cost, size and weight for transmitting and receiving laser beams to and from the space.

What is claimed is:

1. An optical antenna comprising:
   a plurality of optical transmitting and receiving devices that radiate an outgoing optical signal to a space, or receive an incoming optical signal from the space;
   arrangement mechanics on which is mounted said plurality of optical transmitting and receiving devices at different positions;
   an optical system that transmits, when the optical signal is radiated from said optical transmitting and receiving devices, the optical signal to the space by refracting the optical signal to form spherical waves, and focuses, when the optical signal arrives from the space, the optical signal onto said optical transmitting and receiving devices; and
   a selector that selects a desired optical fiber from a plurality of optical fibers mounted on said arrangement mechanism, and that connects the optical fiber selected to said optical transmitting and receiving devices.

2. The optical antenna according to claim 1, wherein said selector selects an optical fiber corresponding to a position of an object to be measured.

3. The optical antenna according to claim 2, wherein said selector makes a position or angle of said optical system variable in response to changes in position of the object to be measured.

4. The optical antenna according to claim 2, wherein said selector rotates, when a wedge prism is installed on an object to be measured side of said optical system, the wedge prism in response to changes in position of the object to be measured.

5. The optical antenna according to claim 2, wherein said selector carries out gimbal driving of said optical system and arrangement mechanism in response to changes in position of the object to be measured.

* * * * *